(12) United States Patent
Pinard

(10) Patent No.: US 6,834,106 B1
(45) Date of Patent: Dec. 21, 2004

(54) CALL CONTROL SYSTEM AND METHOD

(75) Inventor: Debbie Pinard, Kanata (CA)

(73) Assignee: Mitel Corporation, Ontario (CA)

( * ) Notice: Subject to any disclaimer, the term of this patent is extended or adjusted under 35 U.S.C. 154(b) by 440 days.

(21) Appl. No.: 09/642,560

(22) Filed: Aug. 21, 2000

(30) Foreign Application Priority Data

Aug. 23, 1999 (GB) ............................................. 9919959

(51) Int. Cl.⁷ ............................................. H04M 5/00
(52) U.S. Cl. ............................... 379/265.01; 379/265.11
(58) Field of Search ...................... 379/265.01, 265.11, 379/266.01, 309

(56) References Cited

U.S. PATENT DOCUMENTS

| 5,349,636 | A | | 9/1994 | Irribaren ................... 379/88.15 |
|---|---|---|---|---|
| 5,638,494 | A | | 6/1997 | Pinard et al. ................ 709/202 |
| 5,712,902 | A | * | 1/1998 | Florence et al. .......... 379/88.12 |
| 5,742,905 | A | * | 4/1998 | Pepe et al. ................... 455/461 |
| 6,473,612 | B1 | * | 10/2002 | Cox et al. .................... 455/414 |

FOREIGN PATENT DOCUMENTS

| GB | WO 9734401 | 9/1997 |
|---|---|---|
| WO | WO 9747118 | 12/1997 |
| WO | WO 9801985 | 1/1998 |

* cited by examiner

Primary Examiner—Ahmad F. Matar
Assistant Examiner—Quynh H. Nguyen
(74) Attorney, Agent, or Firm—F. Chau & Associates, LLC

(57) ABSTRACT

A call manager receives an incoming call and from this may generate a subsidiary call signal, which it directs to a first call reception component. For example, the call manager may direct the call to a messaging system. If the call manager receives an intercept signal from the caller, it may redirect the subsidiary call signal to another call reception component, for example to another recipient.

26 Claims, 3 Drawing Sheets

CALL CONTROL SYSTEM AND METHOD

FIELD OF THE INVENTION

The present invention relates generally to the field of telecommunications and more specifically to a system and method to permit management and control of telephony calls that may be directed to or received by multiple components or devices.

BACKGROUND OF THE INVENTION

Most organizations today utilize some sort of voice mail or voice messaging system to allow a caller to leave a message if the intended recipient is not available. The call typically arrives at a private branch exchange (PBX) of the organization and is directed or switched to the appropriate party manually by a receptionist, or automatically by the PBX through commands entered through the telephone touchtone keypad. If the called party does not answer the telephone call, the call is forwarded to a voice messaging system which allows the caller to enter further commands and leave a voice message in a voice mailbox assigned to the recipient. Messages left for called parties within an organization can be retrieved by calling the voice messaging system using a telephone and entering appropriate commands through a touch tone keypad. Retrieved messages can be played, forwarded or deleted. An example of a voice messaging system of this nature is the VoiceMemo II® sold by Centigram Communications Corporation of San Jose, Calif.

In addition to voice messaging systems, many organizations also use electronic mail messaging systems and facsimile messaging systems. While typically these additional messaging systems operate separately, attempts have been made to interconnect all messaging systems together. The current trend is to simplify the connection these various messaging systems to allow users access to all types of communications once a connection to the enterprise is made. For example, U.S. Pat. No. 5,349,636 to Irribarren discloses a system and method for voice mail systems and interactive voice response (IVR) systems. The Irribarren system includes a voice message system and a text message system integrated via a network which coordinates the functions of each individual message system. A user may access messages stored in the voice message system and in the text message system via a single telephone call.

Furthermore, the traditional telephone network is not the only way to facilitate voice communications. Advancements are being made in the area of providing voice communications over computer networks to allow people to talk using their computer network infrastructure. This has lead to the connection of telephones and telephony switching devices to computers and computer networks.

However, there are drawbacks to the design of traditional voice messaging systems. Traditional voice messaging systems act as adjuncts to the PBX, in that calls coming to the PBX that are not answered by the recipient are forwarded to the voice messaging system, over an analogue or digital line/trunk. With the transfer of the call, the management and control of the call is also transferred to voice messaging system. This causes a number of problems. The voice messaging system does not have switching functions and is typically limited to capabilities for recording or retrieving voice messages only. As a result of this prior art design, the caller is frequently trapped within the messaging system. Furthermore, once the call is in control of the voice messaging system, there is nothing that the recipient can do interrupt the message to retrieve the call. In addition, the options of the caller are limited once the call is in the hands of the voice messaging system. For example, once bounced to the voice messaging system, the caller cannot initiate the procedures to camp on the recipient's line, initiate a callback, or have the call transferred to another alternate live person instead.

There is a need in the art for a system and method of call management and control that does not require the call to be transferred to an a separate or adjunct system that limits call features.

SUMMARY OF THE INVENTION

The present invention is directed to a system and method where the management and control of the call does not require the call to be transferred or forwarded away from the initial person, but maintains call management and control with a call manager in a manner which is efficient and flexible, while allowing the traditional functions of voice messaging to be performed. The present invention also provides for splitting, channeling, parallel and continued processing of a call so that multiple individuals or devices can be notified and act on the call.

According to one aspect of the present invention there is provided a method of controlling calls comprising steps of: receiving incoming call signals from a caller by an interruptible call manager controlling the call; generating one or more subsidiary call signals from the incoming call signals; directing one or more subsidiary call signals by the interruptible call manager to a first group of one or more call reception components;
receiving an interrupt signal from the caller or one of the call reception components at the interruptible call manager; and redirecting the subsidiary call signals responsive to the interrupt signal to a second group of one or more call reception components.

According to another aspect of the present invention there is provided: a system of directing calls comprising: a) one or more call reception components; and an interruptible call manager coupled to a caller and said call reception components; wherein the interruptible call manager receives incoming call signals from the caller, generates one or more subsidiary call signals from the incoming call signals, and directs one or more of the subsidiary call signals to a first group of the call reception components; and wherein the interruptible call manager redirects the subsidiary call signals responsive to an interrupt signal received from the caller or one of the call reception components to a second group of the one or more call reception components.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
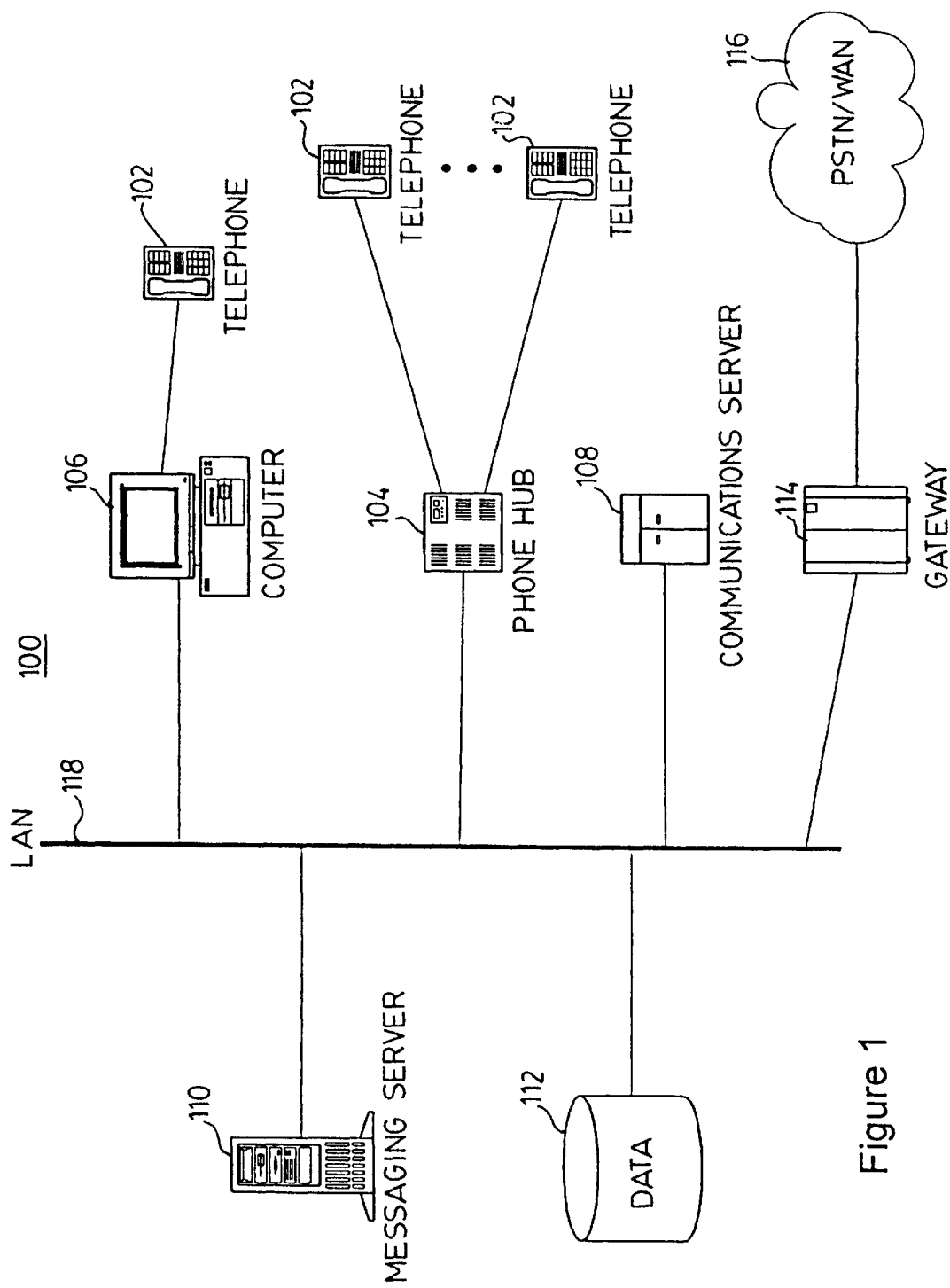
FIG. 1 is a diagrammatic overview of a call system of the present invention.

Turning to FIG. 1, a diagrammatic overview of a preferred embodiment of a call environment 100 of the present invention is shown. The environment 100 is typically employed within a business unit, department or organization. The environment 100 includes call reception components for receiving calls as well as a call manager for managing and controlling calls as is described in further detail below. The call reception and call management components may be embodied numerous devices which can be used to generate, receive, store and communicate messages of various types, which may include voice, email, and facsimile communications.

In a simplest embodiment, the present invention may consist of a single interruptible call manager operating as a software process in memory of a processor based call manager device, which is coupled to one or more call reception devices.

In a more complex embodiment of FIG. 1, environment 100 contains numerous telephones 102 as call reception devices which may be connected to a phone hub 104. Optionally telephones 102 may be connected through computer 106. The phone hub 104 may be a Private Branch Exchange (PBX), such as is well known in the art. In this embodiment, the phone hub 104 acts as a call management device. The phone hub 104 may include a messaging system or be coupled to a messaging system. Telephone 102 may be any standard analog or digital telephone as is well known in the art. When connected to computer 106, telephone 102 may be attached by USB port, RS232 connection or any other appropriate means known in the art. In the example of FIG. 1, computer 106 may also have play/record/DTMF capabilities. DTMF is the acronym for the well-known Dual Tone Modulation Frequency, which are the tones generated by standard push button telephones. A device with play/record/DTMF capabilities can record messages, play messages and perform messaging functions in response to commands entered through a touch tone telephone keypad. Alternatively, each computer 106 may have a telephone functions integrated or embodied within it (not shown)that acts as a call reception and/or call management devices.

Environment 100 may optionally include a communications server 108, a messaging server 110, and data stored in a database 112. Environment 100 may also optionally include a gateway 114 connected to a Public Switched Telephone Network or Wide Area Network (PSTN/WAN) 116. The gateway 114 facilitates communications with the outside world, and may optionally include connections to the Internet.

Phone hub 104, computer 106, communications server 108, messaging server 110, database 112 and gateway 114 may optionally be interconnected by a Local Area Network (LAN) 118 or some other means as is well known in the art.

Phone hub 104 controls stand-alone analogue or digital phones and may also have play/record DTMF capability. Optionally communication server 108 may be used to route calls and provide secure means for running communication (PBX) software. Calls may be voice data or some configuration thereof. Calls may be internal to the organization, or optionally may originate or terminate remotely using gateway 114. The invention operates on calls regardless of whether they originate within the organization, or externally. Gateway 114 may be used to service incoming and outgoing trunks for calls from the WAN utilizing voice over Internet protocols or operate using conventional means for connection to the PSTN in a well-known manner. The messaging server 110 handles the process of storing and retrieving of messages utilizing database 112 as the storage facility, although these functions may be integrated with the phone hub 104. Database 112 may be used for storing the voice mail, electronic mail and facsimile messages. While computer 106, phone hub 104, communication server 108, messaging server 110, database 112 and gateway 114 have been shown as separate devices, one or more of the their functions may be integrated or combined into a single device. The phone hub 104 running in a preferred embodiment is a PBX such as is well known in the art such as is SX-2000 available from Mitel Corporation. Computer 106 is a personal computer running a suitable commercially available operating system as is well known in the art. Communications server may be any appropriate processor based server running server software such as is well known in the art. Likewise, messaging server may be one of any appropriate processor based server as is well known in the art. Database 112 may be any commercially available database such as Oracle from Oracle Corporation. Gateway 114 may be of one any suitable products as available in the art. Lan 118 may run any well-known commercially available local area network, and using any a suitable networking protocol, such as Ethernet.

Figure 2:
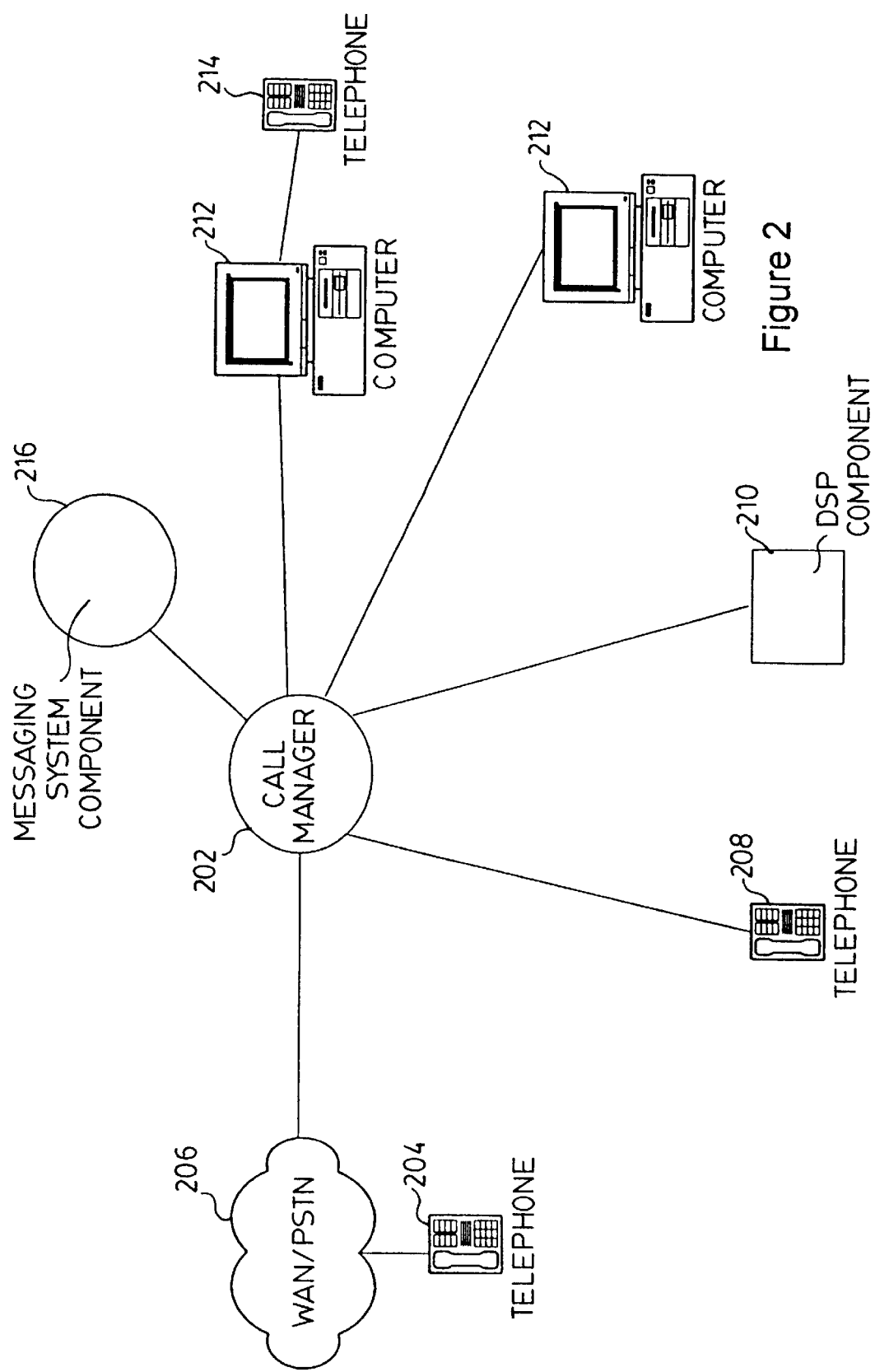
FIG. 2 is a diagrammatic representation of components within the call system of FIG. 1.

Turning to FIG. 2, a conceptual view of the telephony call management and control is shown. When a call originates there may be a number of telephones 208, computers 210 or other devices (not shown) to which the call may be routed. Call reception components are any elements that can receive an incoming call and optionally respond back to the caller. Call reception components may include traditional devices such as a telephone, but also more advanced devices, controllers, software processes or systems including DSP components, voice messaging systems, fax messaging systems and electronic mail messaging systems. The present invention is not limited to any particular type of call reception component. Call manager 202 is responsible for coordinating activities related to the delivery of a call. When a call originates from outside the organization, such as from remote telephone 204 through WAN/PSTN 206, the call manager 202 receives the incoming call signals and generates subsidiary signals to direct the call to various call reception components, which may include a telephone 208, a DSP component 210, computer 212, computer 212 with telephone 214 or messaging system component 216. DSP component 210 is a digital signal processing component, such as is well known in the art, that processes signals such as sound, video, and other analog signals which have been converted to digital form. It is used to decode modulated signals from modems, to process sound, video, and images.

Call manager 202 may also perform some status checks on the status of various call reception components and route the call accordingly. In a preferred embodiment, call manager 202 is implemented as a software process or module stored in RAM, ROM or disk memory on a processor within communications server 108, although it may alternatively be embodied as a software process or module stored on RAM, ROM or disk memory within any processor based call management device. For example, computer 106, phone hub 104 private branch exchange, communications server 108 or messaging server 110 of FIG. 1 could act as a call management device. Call manager 202 is capable of maintaining two way communications with each of the call reception components as well as maintaining constant communications and receiving call signals regarding the incoming call throughout the communication. An important feature of call manager 202 is that it continues to manage and maintains control of the call throughout the duration of the call. This allows for centralized management and clear responsibility for control of the call and maintenance of a uniform interface to a caller among devices that may themselves have non-uniform interfaces. The call manager 202 maintains control of the call, while generating subsidiary signals form the incoming call for splitting, channeling, duplicating or directing the call to one or more of the call reception components. This may be done simultaneously. Optionally, when the needs, circumstances or when interrupt signals sent from the caller or recipient indicate, the call manager 202 may direct the subsidiary call signals to call reception components serially or successfully in a hunting fashion. The subsidiary call signals can be the incoming call itself and may include control signals to the call reception component on how to process or present the call or on what to do or how to handle the call. While each of the call reception components receives a subsidiary call signal, and may perform functions on the call, all such functions are done under the direction and control of the call manager 202. The features of the call manager 202 can be generalized in that the call manager 202 can redirect a call from one group of call reception components to another. There may be one or more call reception components in a group, and call reception components may be members of more than one group. Furthermore, call manager 202 is addressable and interruptible, such that it can receive messages, signals and commands from the call reception components or from the incoming caller to change the status or redirect the call at any time during the communication. This change of status could include any typical call status changes including that the call reception component will receive the call, the call reception component is busy or not to be disturbed, or providing for the canceling, screening or redirecting of the call. The interruptible call manager 202 allows for features and capabilities to be provided which are not available in prior art designs. For example, the call manager 202 may, after ringing a certain telephone 208 that goes unanswered, then direct the call to another telephone as instructed by the caller. Optionally, the call manager 202 may direct the call for the automated recordal of a message. The call manager 202 would instruct a messaging system 216 to play a pre-recorded outgoing message, then direct DSP component 210 to decipher commands entered from the caller's touch tone phone keypad. With the call manager still in control of the call, the caller could instruct the call manager, through the DSP component 210, to route the call to another destination or recipient. Thus, the caller is not trapped within the messaging system and is free to connect to other users without having to hang up and make another call. As an alternative, the caller from an appropriate call reception device, such as a telephone, could signal commands to change the status to camp on the call, rather than leave a message. Since the call manager 202 is interruptible, this could be done at any time during the call, even during message recordal. In another example, the call manager 202, after a call goes unanswered at telephone 208, direct the messaging system 216 to record a message from the caller, while at the same time, split, duplicate and direct the subsidiary call signal output from the caller to both the messaging system 216 for recordal and to the speaker of the called telephone 208. This allows a recipient to perform call screening of the incoming call. If a recipient, listening to the message, determines that the call is urgent, the recipient may pick up the call at telephone 208, sending an interrupt signal to the call manager 202, which could then connect the call and cancel the message. This splitting and duplicating by the call manager could be simply and easily performed for any number of call reception components which could cause each to perform a different function on the call.

Figure 3:
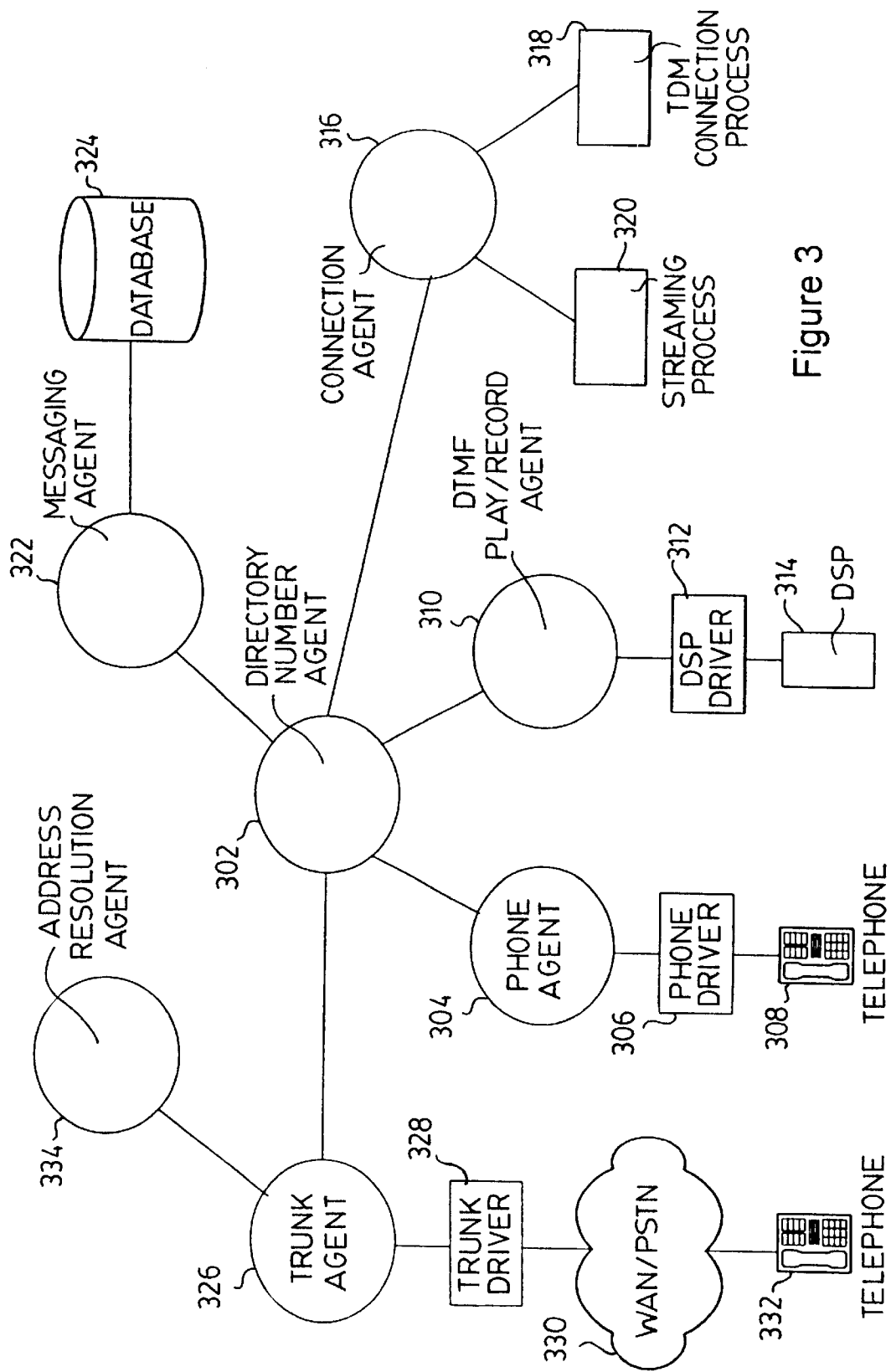
FIG. 3 is a diagrammatic representation illustrating an interaction between processing elements of the components of FIG. 2.

FIG. 3 is a further illustration of a preferred embodiment of the present invention where processing elements are implemented as agents. While agents are used for the purposes of the illustration in FIG. 3, it can be appreciated by a person skilled in the art that the invention may be adapted or implemented without the use of agents using other obvious alternate embodiments without deviating from the sphere and scope of the invention.

FIG. 3 shows a sequence of events between agents when an incoming trunk call is directed to a particular directory number. The circles represent software agents, which may be implemented as software processes written in any appropriate computer language running on a processing device. A general system using agents has been described in the publications "Toward A Taxonomy of Multi-Agent Systems", Int. J. Man-Machine Studies (1993), 39, 689–704, Academic Press Limited, and "An Intelligent Agent Framework for Enterprise Integration: by Jeff Y. C. Pan and Jay M. Tenenbaum, Transactions on Systems, Man and Cybernetics, (Vol. 21, No. 6, November/December, 1991, pages 1391–1407. An example of a communication system using agents has also been described in U.S. Pat. No. 5,638,494. Each of the software agents could be implemented using Object Linking and Embedding (OLE) Component Object Model (COM) objects. Both OLE and COM were developed by Microsoft® and are described at the Internet site "www.microsoft.com/oledev/olecom/ aboutole. html." The directory number agent 302 is responsible for all software relating to the origination or termination of a call for a particular directory number. The directory number agent is coupled or embedded in the call manager 202 of FIG. 2. The phone agent 304 which may be coupled to or optionally embodied within call manager 202, is responsible for handling all messages directed to the phone driver 306, or receiving messages from the phone driver 306 and informing the directory number agent 302. Phone driver 306 coupled to telephone 308 and phone agent 304, which may reside in either component sends and receives signals from the telephone 308 and converts them to an appropriate format for use by the phone agent 302. It controls telephone 308. The DTMF/play/record agent 310 is responsible for performing the DTMF detection, playing and recording functions as directed by the directory number agent 302. It communicates with a DSP driver 312 . DSP driver 312 communicates with DSP 314. The DSP driver 312, coupled to DTMF/play/record agent 310 and DSP 314 sends and receives signals from the DSP 314 and converts them into an appropriate format for use by agent 310.

The connection agent 316 preferably coupled to or embodied in call manager 202 is responsible for making connections as indicated by the directory number agent 302. These connections may be circuit switch (TDM) based, or may involve voice over IP streaming software. For TDM based connections, connection agent 316 interfaces with a TDM connection process 318 that is preferably implemented in software. The TDM connection process 318 interfaces with TDM hardware (not shown). TDM connection process 318 software and related hardware may be any such suitable product as is well known in the art.

Likewise, for voice over IP based connections, connection agent 316 interfaces with a streaming process 320 that is preferably implemented in software. The streaming process 320 interfaces with voice over IP hardware (not shown). Streaming process 320 software and related hardware may be any suitable commercially available product as is well known in the art.

Communications with a messaging application is controlled by a messaging agent 322. Messaging agent 322 which is embodied in or coupled to messaging system component 216 or call manager 202 is responsible for taking voice mail, email or other types of messages and passing them on for messaging management. Messaging system component, connected to a database 324 with typical database functions for the storage and retrieval of messages.

Trunk agent 326 which is embodied in or coupled to trunk equipment (not shown) is responsible for communications to and from trunk driver 328. Trunk driver 328 connects, using well known hardware and software, to WAN/PSTN 330 for connections to the outside world. In this manner a connection can be made from telephone 332 in the outside world to a telephone 308 within the organization. Address resolution agent 334, in which is embodied in or coupled to call manager 202, is responsible for taking a dialed digit string and resolving it to the correct directory number agent 302. Directory numbers may represent groups as well as individuals.

The following illustrates an example of a communication from a caller outside an organization to a recipient in the organization. First a caller generated signal comes to trunk driver 328 indicates that a call has been initiated from a telephone 332 across WAN/PSTN 330. The trunk driver 328 informs the trunk agent 326 of the call by sending a message to trunk agent 326. The address (or digits) involved are included in this message sent. The trunk agent 326 then makes a request by sending a message to the address resolution agent 334 to identify the appropriate directory number agent 302 from the plurality of directory member agents to route the call to. The address resolution agent 334 sends a responding message stating the appropriate directory particular number agent 302 responsible for that address. The trunk agent 326 then sends a message request to the particular directory number agent 302 to accept a call from the incoming trunk. The particular directory number agent 302 then looks at the status of the directory number, to see which device to use to handle the call. A table or database, or optionally the device itself, can be queried to determine its status. For example, the directory number may be busy, forwarded to another number or set to receive voice messages only. If the telephone 308 is busy, does not answer, or the directory number is set by the recipient to record a voice message, the main device handling the call may be a DSP 314 or a similar device, The DSP 314 and DSP driver 312 plays messages, record messages, and accept DTMF signals. In the event that the call is to be answered by the DSP 314, the directory number agent 302 then asks the connection agent 316 to connect the incoming call to the DSP 314. Optionally, the connection agent 316 may communicate through the directory number agent 302 to the phone agent 304 to stream the audio to the telephone 308 as well, so the recipient can hear what is going on—like on an answering machine. Optionally, a message will be sent back through the directory number agent 302 to the trunk agent 326 indicating that the call has been answered. The directory number agent 302 also informs the DTMF/Play/Record agent 310 on what message to play. The directory number agent 302 can also tell the phone agent 304 that the DSP 314 is handling the call, and that it can let the recipient hear the audio. The DSP driver 312 is informed by the directory number agent 302 to perform its task. During the call, the caller on telephone 332 can input DTMF tones, which have special meaning to the voice mail component managed by the messaging agent 322, handled by the directory number agent 302, which directs the DTMF/play/record agent 310 appropriately. When a message from the caller from telephone 332 has been recorded, the message is sent back to the directory number agent 302, who then passes it to the messaging agent 322, to store the message in the appropriate database 324 for that particular directory number. If during the message, the recipient on telephone 308 decides they want to be connected to the incoming caller, the recipient by pressing a key on the telephone 308 notifies the phone driver 306, who lets the phone agent 304 know, which in turn lets the directory number agent 302 know, which then changes the connections through the connection agent 316. The DSP 314 is disconnected, and the play/record is stopped. The trunk agent 326 is informed by the connection agent 302 of the status of the call. The trunk agent 326 (or another directory number agent if the call is internal), can also decide at the caller's request, to change the call so that a campon function (queue) is performed instead, or a callback is set. In this manner, the directory number agent 302 coordinates and manages the call connection to facilitate the additional features described above.

In an alternate embodiment of the present invention, a suitable speech recognition system such as is commercially available could be used as a call reception component to allow a caller to indicate what they want done with the call, instead of using DTMF signals. In a further embodiment, the incoming call could be over the Internet, or could be an H.323 call, with data and video capability. H. 323 is a public standard developed by the ITU-T (International Telecommunications Union, Telecommunications Standards Sector) to allow terminals and other entities to provide multimedia communications services over packet based networks. In this alternate embodiment, the calling party with a computing device through a wide area network and gateway, could have access to a communication server, or an automated attendant on an application server that is web based that facilitates communication with a call recipient or end user, and the caller could indicate his preference for campon or callback or leaving a message through this interface instead of using DTMF signal.

Although the invention has been described in terms of the preferred and several alternate embodiments described herein, those skilled in the art will appreciate other embodiments and modifications which can be made without departing from the sphere and scope of the teachings of the invention. All such modifications are intended to be included within the scope of the claims appended hereto.

What is claimed is:

1. A method of controlling calls comprising the steps of:
    a) receiving incoming call signals from a caller by an interruptible call manager;
    b) generating one or more subsidiary call signals from said incoming call signals;
    c) while said interruptible call manager is receiving and maintaining control over said incoming call signals, said interruptible call manager directing said one or more subsidiary call signals to a first group of one or more call reception components, wherein said first group includes at least one adjunct call reception component;
    d) while said interruptible call manager is maintaining control over said directing, at least said at least one adjunct call reception component from said first group answering, receiving, and having control over handling the received subsidiary call signals;
    e) during said handling step, said interruptible call manager receiving an interrupt signal from another call reception components; and
    f) in response to said interrupt signal, said interruptible call manager redirecting said subsidiary call signals away from said at least one adjunct call reception component to a second group of one or more call reception components.

2. The method of claim 1 wherein said directing or said redirecting to said first group or said second group is conducted to respective said one or more call reception components simultaneously.

3. The method of claim 1 wherein said directing or said redirecting to said first group or said second group is conducted to respective said one or more call reception components successively.

4. The method of claim 1 wherein said interruptible call manager is a software process operating within a processor based call management device.

5. The method of claim 4 wherein said interruptible call manager and said call reception components are represented by agents.

6. The method of claim 4 wherein said processor based call management device is a computer, phone hub, private branch exchange, communications server or messaging server.

7. The method of claim 1 wherein said call reception components are telephones, DSP components, computers, voice messaging systems, fax messaging systems or electronic mail messaging systems.

8. The method of claim 1 wherein the same said call reception components are members of said first group and said second group.

9. The method of claim 1 wherein said second group of said one or more call reception components receives said subsidiary call signals in different combination or state.

10. The method of claim 1 wherein said interrupt signal is generated from a touch tone telephone.

11. The method of claim 1 wherein said subsidiary call signals are directed to a telephone and voice mail messaging system of said first group of one or more call reception components.

12. The method of claim 1 wherein said subsidiary call signals are directed to a telephone and voice mail messaging system of said first group of one or more call reception components.

13. A system of directing calls comprising:
   a) one or more call reception components, said one or more call reception components including at least one adjunct call reception component; and
   b) an interruptible call manager coupled to a caller and said call reception components;
      wherein said interruptible call manager receives incoming call signals from said caller, generates one or more subsidiary call signals from said incoming call signals, and while receiving and maintaining control over said incoming call signals directs one or more of said subsidiary call signals to a first group of said call reception components; and wherein after at least one adjunct call reception component in said first group has answered and assumed control over said one or more of said subsidiary call signals, said interruptible call manager redirects said subsidiary call signals responsive to an interrupt signal received from another one of said call reception components while said interruptible call manager is maintaining control over said incoming call signals and directing one or more of said subsidiary call signals to said first group, away from said at least one adjunct call reception component to a second of said one or more call reception components.

14. The system of claim 13 wherein said directs or said redirects to said first group or said second group is conducted to respective said one or more call reception components simultaneously.

15. The system of claim 13 wherein said directs or said redirects to said first group or said second group is conducted to respective said one or more call reception components successively.

16. The system of claim 13 wherein said interruptible call manager is a software process operating within a processor based call management device.

17. The system of claim 16 wherein said interruptible call manager is facilitated by an agent.

18. The system of claim 16 wherein said call reception devices are represented by agents.

19. The system of claim 16 wherein said processor based call management device is a computer, phone hub, private branch exchange, communications server or messaging server.

20. The system of claim 13 wherein said call reception components may be telephones, DSP components, computers, voice messaging systems, fax messaging systems or electronic mail messaging systems.

21. The system of claim 13 wherein the same said call reception components are members of said first group and said second group.

22. The system of claim 13 wherein said second group of said one or more call reception components receives said subsidiary call signals in different combination or state.

23. The system of claim 22 wherein said different combination or state includes playing said call on a speaker of said one or more call reception devices, interrupting the subsidiary call signal to pick up said call, or transferring said call to another said call reception device.

24. The system of claim 13 wherein said interrupt signal is generated from a touch tone telephone.

25. The system of claim 13 wherein said subsidiary call signals are directed to a telephone and voice mail messaging system of said first group of one or more call reception components simultaneously.

26. The system of claim 13 wherein said subsidiary call signals are redirected to a telephone and voice mail messaging system of said second group of one or more call reception components simultaneously.

* * * * *